(12) United States Patent
Shippen et al.

(10) Patent No.: US 11,085,561 B2
(45) Date of Patent: Aug. 10, 2021

(54) IMMOBILISED INSERT

(71) Applicant: BAKER HUGHES ENERGY TECHNOLOGY UK LIMITED, Bristol (GB)

(72) Inventors: Leigh Shippen, Newcastle-upon-Tyne (GB); Ashley Clack, Newcastle-upon-Tyne (GB); David Lambert, Newcastle-upon-Tyne (GB); Balaji Aresh, Newcastle-upon-Tyne (GB); Paul Snowdon, Newcastle-upon-Tyne (GB)

(73) Assignee: BAKER HUGHES ENERGY TECHNOLOGY UK LIMITED, Bristol (GB)

( * ) Notice: Subject to any disclaimer, the term of this patent is extended or adjusted under 35 U.S.C. 154(b) by 91 days.

(21) Appl. No.: 16/347,661

(22) PCT Filed: Nov. 30, 2017

(86) PCT No.: PCT/GB2017/053621
§ 371 (c)(1),
(2) Date: May 6, 2019

(87) PCT Pub. No.: WO2018/104707
PCT Pub. Date: Jun. 14, 2018

(65) Prior Publication Data
US 2019/0316711 A1    Oct. 17, 2019

(30) Foreign Application Priority Data

Dec. 6, 2016 (GB) ..................... 1620745

(51) Int. Cl.
*F16L 11/16* (2006.01)
*B21C 37/12* (2006.01)
*F16L 11/08* (2006.01)

(52) U.S. Cl.
CPC ............ *F16L 11/16* (2013.01); *B21C 37/121* (2013.01); *B21C 37/122* (2013.01); *B21C 37/123* (2013.01); *F16L 11/081* (2013.01)

(58) Field of Classification Search
CPC ....... F16L 11/16; F16L 11/081; B21C 37/121; B21C 37/122; B21C 37/123
(Continued)

(56) References Cited

U.S. PATENT DOCUMENTS

2015/0040633 A1    2/2015   Thompson et al.
2017/0175933 A1*   6/2017   Secher ................. F16L 55/041

FOREIGN PATENT DOCUMENTS

AU    2015217013 A    9/2016
CN    85103769 A      11/1986
(Continued)

OTHER PUBLICATIONS

Search Report received in GB Application No. 1620745.8, dated Apr. 4, 2017, in 4 pages.
(Continued)

*Primary Examiner* — Craig M Schneider
*Assistant Examiner* — David R Deal
(74) *Attorney, Agent, or Firm* — Knobbe, Martens, Olson & Bear, LLP (57) ABSTRACT

A method and apparatus are disclosed. The method includes the steps of providing an elongate sheet having a uniform thickness and a first and further spaced apart long edge, to a first pair of a plurality of spaced apart pairs of opposed forming roller elements, and via the pairs of roller elements, progressively forming a cross-sectional profile in the sheet that comprises a body portion comprising a folded central region of the sheet and a first and further wing portion that each extend away from the body portion and terminate at a respective long edge of the sheet, and securing adjacent
(Continued)

regions of the wing portions and/or opposed regions of the body portion together thereby providing a windable elongate tape element having laterally immobilised wing portions.

19 Claims, 8 Drawing Sheets

(58) Field of Classification Search
USPC .................................. 138/129, 134, 135, 136
See application file for complete search history.

(56) References Cited

FOREIGN PATENT DOCUMENTS

| CN | 102353294 | 2/2012 |
|---|---|---|
| CN | 103906959 | 7/2014 |
| CN | 105268867 | 1/2016 |
| CN | 105517723 A | 4/2016 |
| CN | 105992899 | 10/2016 |
| FR | 2856131 A1 | 12/2004 |
| FR | 3017439 A1 | 8/2015 |
| JP | 2006213262 | 8/2006 |
| WO | WO 01/81810 A1 | 11/2001 |
| WO | WO 2008/003813 A1 | 1/2008 |
| WO | WO 2014/00816 | 1/2014 |
| WO | WO 2014/167346 A1 | 10/2014 |
| WO | WO 2015/121316 A1 | 8/2015 |

OTHER PUBLICATIONS

Search Report and Written Opinion received in International Application No. PCT/GB2017/053621 dated Mar. 3, 2018, in 17 pages.
International Preliminary Report on Patentability for International Application No. PCT/GB2017/053621 dated Jun. 11, 2019.

* cited by examiner

IMMOBILISED INSERT

The present invention relates to a method and apparatus for manufacturing an elongate tape and to a flexible pipe and to a method of manufacturing a flexible pipe. In particular, but not exclusively, the present invention relates to the provision of a windable elongate tape having a cross-section including a body and wings which can at least partly be inserted between carcass windings of a flexible pipe. The wings and/or body of the insertable tape are laterally immobilised to help prevent lateral relative movement of the wing portions.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). A flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or a pressure armour or a tensile armour layer of the flexible pipe body is increased. It is noted for the sake of completeness that flexible pipe may also be used for shallow water applications (for example less than around 500 metres depth) or even for shore (overland) applications.

For flexible pipes which include a carcass layer, that is to say rough bore flexible pipes, a well-known problem is that the internal carcass has a profile that can cause flow induced vibrations or flow induced pulsations (FLIP) which can cause "singing". WO2014/000816 helps describe this problem and proposes a solution.

However, a problem with the solution/s proposed in WO2014/000816 is that the insert profiles which are proposed are difficult to manufacture themselves and also prove difficult to handle when manufacturing flexible pipe body. Furthermore over time performance of the inserted profiles disclosed in '816 and other suggested solutions to the FLIP problem can wane and there is a risk of failure of the inserted profile which could lead to pipe failure.

It is an aim of the present invention to at least partly mitigate the above-mentioned problems.

It is an aim of certain embodiments of the present invention to provide an elongate tape which can be wound between adjacent windings of a carcass layer to help reduce a risk of "singing" and which can be manufactured conveniently and cost effectively and which produces an insert tape profile which is robust enough to perform throughout an expected lifetime of a flexible pipe.

It is an aim of certain embodiments of the present invention to provide a windable tape having a cross-section including wing portions and a body portion that is to some extent insertable between armour wires of a flexible pipe and which helps avoid failure of the tape in use.

It is an aim of certain embodiments of the present invention to provide a method of manufacturing flexible pipe body in which an insert tape can be formed and inserted in real time as a carcass winding tape is wound around an underlying layer to thereby form a carcass layer in flexible pipe body.

It is an aim of certain embodiments of the present invention to provide an insert, formed originally from a long narrow flat sheet/strip, in which wing portions in a cross-section of the insert are laterally immobilised with respect to each other.

It is an aim of certain embodiments of the present invention to help eliminate or at least partly alleviate residual stress formed in the cross-section of a folded strip to help avoid failure of a flexible pipe, formed by winding the strip, over the pipe lifetime.

According to a first aspect of the present invention there is provided a method of manufacturing an elongate tape element for bridging a gap between windings of a flexible pipe body layer, comprising the steps of:

providing an elongate sheet having a uniform thickness and a first and further spaced apart long edge, to a first pair of a plurality of spaced apart pairs of opposed forming roller elements;

via the pairs of roller elements, progressively forming a cross-sectional profile in the sheet that comprises a body portion comprising a folded central region of the sheet and a first and further wing portion that each extend away from the body portion and terminate at a respective long edge of the sheet; and securing adjacent regions of the wing portions and/or opposed regions of the body portion together thereby providing a windable elongate tape element having laterally immobilised wing portions.

Aptly the method further comprises securing regions together by welding the regions together via a fusion welding or solid state welding process.

Aptly the method further comprises welding the regions together continuously along a whole length of the tape element thereby providing a continuous weld along the tape element.

Aptly the method further comprises providing a substantially smooth abutment surface to the elongate tape element, said abutment surface comprising an outer surface portion of the weld and a respective outer surface portion of each of the first and further wing portions.

Aptly the method further comprises welding regions together repeatedly as a row of spaced apart spot welds along a length of the tape element.

Aptly the method further comprises welding the regions together in a single pass as the folded sheet having the formed cross-sectional profile passes proximate to at least one welding station.

Aptly the method further comprises securing adjacent regions together subsequent to the step of progressively forming the cross-sectional profile via the pairs of roller elements.

Aptly the method further comprises welding regions together via a single sided process.

Aptly the method further comprises welding regions together in an open or closed butt joint.

Aptly the method further comprises welding regions together in an open or closed flanged joint.

Aptly the method further comprises welding regions together to provide a single-flare V-groove weld.

Aptly the method further comprises simultaneously relieving residual stress in the folded sheet material via heat generated during the welding process.

Aptly the method further comprises securing regions together by bonding the regions together.

Aptly the method further comprises bonding the regions together via an adhesive or mechanical bond.

Aptly the method further comprises bonding the regions together via an adhesive bonding process or a brazing process or a soldering process or a thermal spraying process.

According to a second aspect of the present invention there is provided a method of manufacturing flexible pipe body, comprising the steps of:
  helically winding at least one armouring tape over an underlying layer; and
  helically winding an elongate tape element comprising a pre-folded strip having a cross-section including a first and further wing portion that are laterally immobilised and extend from a common body portion, over the underlying layer whereby at least a region of the body portion of the elongate tape element is located between adjacent windings of the armouring tape.

Aptly the method further comprises providing the pre-folded strip to a winding station by the steps of:
  providing an elongate sheet having a uniform thickness and a first and further spaced apart long edge, to a first pair of a plurality of spaced apart pairs of opposed forming roller elements;
  via the pairs of roller elements, progressively forming a cross-sectional profile in the sheet that comprises a body portion comprising a folded central region of the sheet and a first and further wing portion that each extend away from the body portion and terminate at a respective long edge of the sheet; and
  securing adjacent regions of the wing portions and/or opposed regions of the body portion together thereby providing a windable elongate tape element having laterally immobilised wing portions.

Aptly the method further comprises securing regions together by welding the regions together via a fusion welding or solid state welding process.

Aptly the method further comprises welding the regions together continuously along a whole length of the tape element thereby providing a continuous weld along the tape element.

Aptly the method further comprises simultaneously relieving residual stress in at least one region of the folded sheet as the sheet is welded.

Aptly the method further comprises providing a substantially smooth abutment surface to the elongate tape element, said abutment surface comprising an outer surface portion of the weld and a respective outer surface portion of each of the first and further wing portions.

Aptly the method further comprises providing a carcass layer of the flexible pipe body by the steps of winding the at least one armouring tape and the elongate tape element.

Aptly the method further comprises at least partially bridging a radially inner gap between adjacent self-interlocking windings of the armouring tape via the laterally immobilised wing portions, whereby a substantially smooth surface of the elongate tape element provided by a surface of the weld and surface regions of the wing portions face radially inwards.

According to a third aspect of the present invention there is provided an elongate tape element for bridging a gap between windings of a flexible pipe body layer, having a cross-sectional profile comprising:
  a body portion at least partially locatable in a gap between adjacent windings of a layer of a flexible pipe;
  a first wing portion extending from the body portion to a first wing end; and
  a further wing portion extending from the body portion to a further wing end; wherein
  the elongate tape element comprises at least one V-groove weld between the wing portions that laterally immobilises the wing portions.

Aptly the first and further wing portions extend freely from the weld and have a substantially uniform thickness.

Aptly at least a portion of the body portion comprises a folded portion in which folded strip material has a substantially uniform thickness that matches said a substantially uniform thickness of the wing portions.

Aptly the elongate tape element further comprises a substantially smooth abutment surface provided by an outer surface portion of the weld and a respective outer surface portion of each of the wing portions.

Aptly a wing span between the first wing end and the further wing end is larger than a maximum possible width of the gap.

Aptly the body portion is at least partially locatable in a gap between edges of adjacent windings that each have a curved surface.

Aptly the cross-sectional profile is approximately T-shaped.

Aptly the body portion has an approximately U-shaped profile.

Aptly the body portion has a first side portion and a further side portion.

Aptly the body portion has a base portion between the first side portion and the further side portion.

Aptly the substantially uniform thickness of the wing portions comprised tapered away wing portions that have a surface region that is tapered.

Aptly the elongate tape element is manufactured from a material that is a metal or steel alloy or non-metal or a polymer or an elastomer or a rubber or a foam or a combination of said material.

Aptly the elongate tape element comprises a coating.

Aptly the first wing end comprises a first long edge of the tape element and the further wing end comprises a further long edge of the tape element.

According to a fourth aspect of the present invention there is provided flexible pipe body comprising a layer including a winding of an elongate tape element.

Aptly said a layer comprises a carcass layer that further includes a winding of a self-interlocking armouring tape.

According to a fifth aspect of the present invention there is provided a flexible pipe comprising flexible pipe body.

According to a sixth aspect of the present invention there is provided a method of manufacturing an elongate tape element for bridging a gap between windings of a flexible pipe body layer, comprising the steps of:
  providing an elongate sheet having a uniform thickness and a first and further spaced apart long edge, to a first pair of a plurality of spaced apart pairs of opposed forming roller elements;
  via the pairs of roller elements, progressively forming a cross-sectional profile in the sheet that comprises a body portion comprising a folded central region of the sheet and a first and further wing portion that each extend away from the body portion and terminate at a respective long edge of the sheet; and
  heating the folded central region or at least one other region of the cross-sectional profile of the sheet to thereby relieve residual stress in the folded sheet material.

Aptly the method further comprises heating the folded central region by welding adjacent regions of the wing portions and/or opposed regions of the body portion together and simultaneously heating the region via heat generated during the welding process.

According to a seventh aspect of the present invention there is provided a method substantially as hereinbefore described with reference to the accompanying drawings.

According to an eighth aspect of the present invention there is provided apparatus constructed and arranged substantially as hereinbefore described with reference to the accompanying drawings.

Certain embodiments of the present invention provide a method of manufacturing an elongate tape which can be wound as an insert locatable between self-interlocking windings of a carcass layer and in which the insert tape has a cross-sectional profile and characteristics that make the tape suitable for use over an extended lifetime, relative to conventional inserts used to help reduce FLIP. For example twenty five years or more, which is the expected lifetime of a flexible pipe.

Certain embodiments of the present invention provide an elongate tape and a method of providing an elongate tape in which wing portions in a cross-section of the tape are laterally immobilised. This helps provide fatigue mitigation on a central base region of the strip. Effectively securing wings in the cross-section together eliminates bend points where fatigue may otherwise cause failure. Likewise effectively avoiding any chance of relative motion causes a slipping action to occur as carcass windings move rather than wings being dragged apart or together by frictional forces at the interface between carcass windings and the insert tape.

Certain embodiments of the present invention provide an elongate tape and method of manufacturing an elongate tape and method of using a tape to manufacture flexible pipe body in which the windable tape has wing portions that perform like a plate in tension rather than including hinged bend regions. Wings are laterally immobilised via a long continuous weld or series of stitch welds which effectively bridge a fold in the cross-section of the insert tape.

Certain embodiments of the present invention utilise the application of heat to one or more regions of a folded strip used to help form a layer in a flexible pipe to thereby reduce residual stress in the strip. This can help avoid failure of the flexible pipe during its working lifetime. Aptly the residual stress is entirely or at least partly eliminated at a central folded back region in the cross-section of the folded strip. Aptly this can be achieved simultaneously as parts of the folded strip cross-section are laterally immobilised with respect to each other via a welding process.

Certain embodiments of the present invention will now be described hereinafter, by way of example only, with reference to the accompanying drawings in which.

In the drawings like reference numerals refer to like parts.

Throughout this description, reference will be made to a flexible pipe. It is to be appreciated that certain embodiments of the present invention are applicable to use with a wide variety of flexible pipe. For example certain embodiments of the present invention can be used with respect to flexible pipe and associated end fittings of the type which is manufactured according to API 17J. Such flexible pipe is often referred to as unbonded flexible pipe. Other embodiments are associated with other types of flexible pipe.

Figure 1:
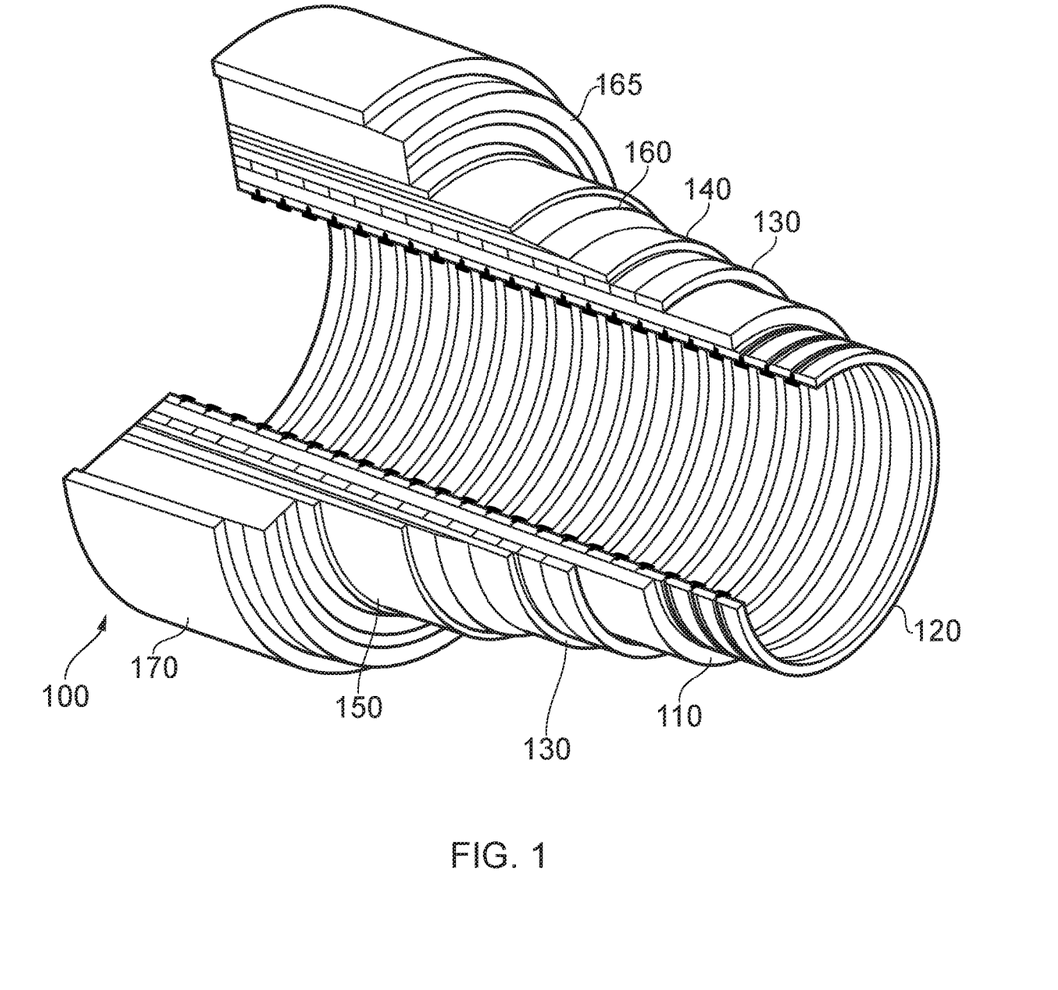
FIG. 1 illustrates flexible pipe body.

Turning to FIG. 1 it will be understood that the illustrated flexible pipe is an assembly of a portion of pipe body and one or more end fittings (not shown) in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that a carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially positioned within the barrier layer.

A pressure armour layer 130 is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition. A pressure armour layer is positioned radially outside an underlying barrier layer.

The flexible pipe body also includes an optional first tensile armour layer 140 and optional second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is typically formed from a plurality of wires. (To impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape 160 which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging".

The flexible pipe body also includes optional layers of insulation 165 and an outer sheath 170, which comprises a polymer layer used to protect the pipe against penetration of seawater and other external environments, corrosion, abrasion and mechanical damage. Any thermal insulation layer helps limit heat loss through the pipe wall to the surrounding environment.

Each flexible pipe comprises at least one portion, referred to as a segment or section, of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
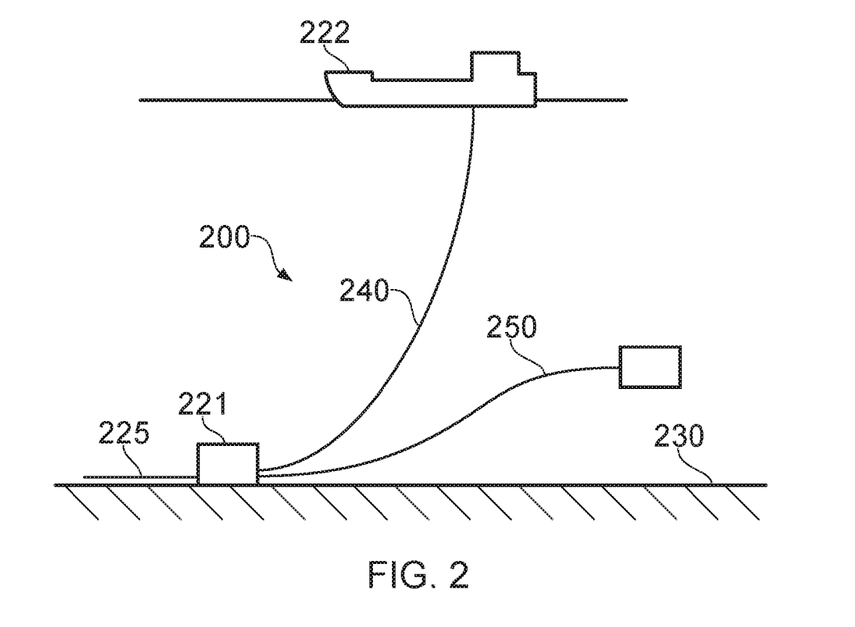
FIG. 2 illustrates certain uses of a flexible pipe.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes).

Some, though not all, examples of such configurations can be found in API 17J. FIG. 2 also illustrates how portions of flexible pipe can be utilised as a jumper 250.

Figure 3:
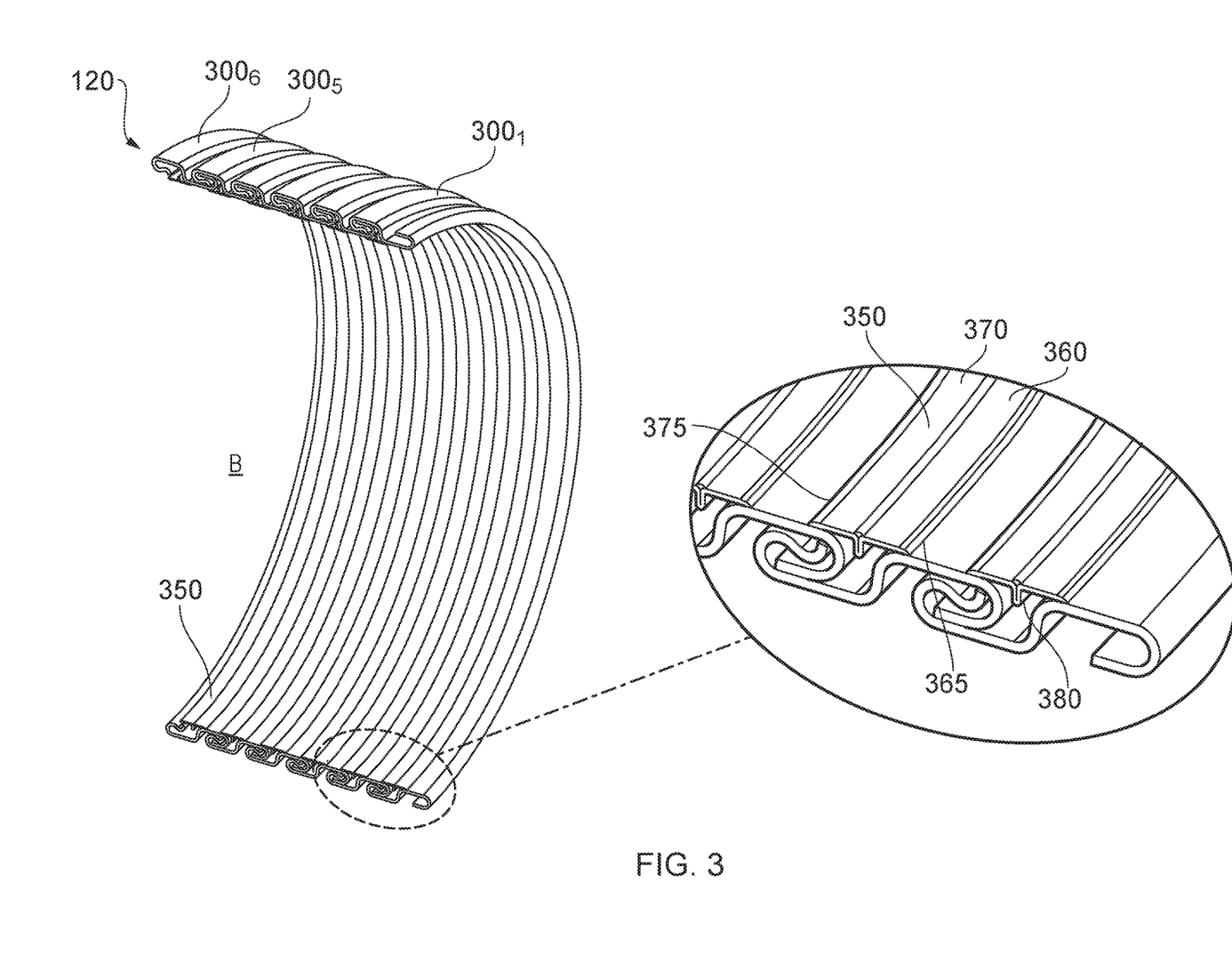
FIG. 3 illustrates a carcass layer cuding self-interlocking carcass windings and an interspaced wound insert tape.

FIG. 3 illustrates the carcass layer 120 in more detail. As shown in FIG. 3 the carcass layer is a generally tubular structure formed by self-interlocked windings of a elongate tape having a generally S-shaped cross-section. Each winding $300_{1-6}$ is formed from a folded strip and is manufactured by winding the profile strip over an underlying substantially cylindrical layer whereby each new winding will self-interlock with an immediately preceding winding. In this way each winding forms an effective hoop which resists collapse pressures exerted externally on a flexible pipe.

FIG. 3 also helps illustrate how a smoothing insert 350 can be wound on the radially inner surface of the windings of the carcass layer. As illustrated in FIG. 3 the smoothing insert is formed from a folded strip having a generally T-shaped cross-section. Alternatively the smoothing insert may have a V-shape or L-shape. As shown in FIG. 3, the illustrated insert 350 has a cross-section which includes a first wing portion 360 which ends in a tip 365 formed from a long edge of the folded strip and a further wing portion 370 which likewise has a tip 375 formed from another edge of the folded strip. At the centre of the cross-section of the insert strip is a generally U-shaped body portion 380 which, when wound as part of the carcass layer, extends radially outwardly away from the central bore B formed by the carcass layer and barrier layer. In use, as the flexible pipe body, which includes the carcass layer 120, bends and flexes the self-interlocking windings repeatedly move nearer and further apart depending upon their position with respect to a bending site. The body portion 380 of the smoothing insert helps keep the insert duly located with respect to the adjacent windings of the carcass tape where the smoothing insert winding is positioned. The insert shown can be manufactured in a convenient manner from an initial flat strip. This makes it economically attractive. It will be understood that certain embodiments of the present invention can be utilised with carcass windings that are non self interlocking. For example where locking windings are used in conjunction with primary non interlocking windings.

By virtue of the helically wound smoothing insert the gaps which would otherwise be exposed between adjacent primary windings of the carcass layer are entirely or at least significantly filled. That is to say a radially inner surface (that face a pipe bore in use) provided by the radially inner surface of the carcass windings together with the radially inner surface of the windings of the smoothing insert present a much smoother surface than would otherwise be provided by a conventional rough bore flexible pipe without such a smoothing insert. Smoothing the surface of the carcass layer generally reduces turbulent flow of fluid transported along the bore of the pipe and tends to engender more laminar flow. As a result greater flow rates and thus more favourable flow characteristics can be provided. FLIP can also be wholly or at least partially avoided.

Figure 4:
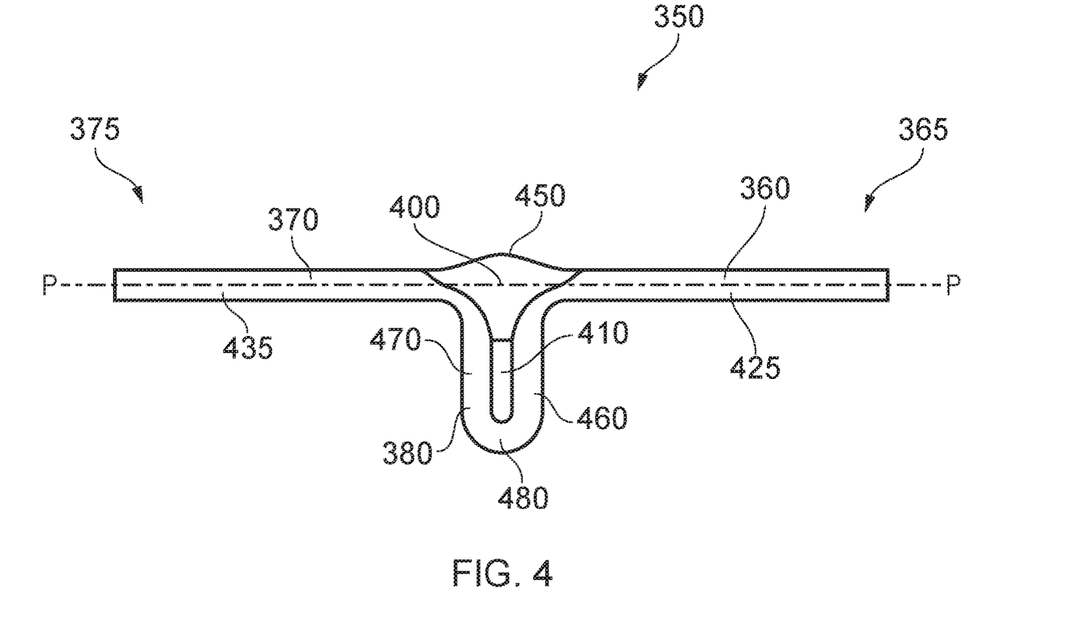
FIG. 4 illustrates an example of a cross-section of a welded elongate tape.

FIG. 4 helps illustrate a cross-section of the windable insert 350 in more detail. In particular FIG. 4 helps illustrate how the cross-section of the insert 350 generally has a uniform cross-section. This is because the insert itself is originally formed from a flat strip having a uniform cross-section in which folds are made to create the desired cross-section. As illustrated in FIG. 4, the insert according to certain embodiments of the present invention includes a welded portion 400. The weld 400 illustrated is a continuous weld which extends along a whole length of the insert. Alternatively according to certain other embodiments of the present invention the weld could be a series of stitch welds rather than the continuous weld as illustrated in FIG. 4. Where a weld is located, the thickness of the material in the cross-section may be non uniform.

As shown in FIG. 4 the weld 400 bridges an otherwise open gap between opposed wings 360, 370 in the cross-section of the insert tape. The weld bridges the gap and secures one wing portion to another thereby effectively laterally immobilising one wing with respect to another. That is to say respective motion of the wings away from one another or towards each other is substantially or wholly avoided. Aptly the weld shown is around 1.6 mm from the top of the peak of the weld to the bottom of the weld. It will be appreciated that whilst the weld 400 illustrated in FIG. 4 is provided at an upper level in the cross-section which is substantially in the same plane P-P as the wings 360, 370, the weld could additionally extend downwards into the trough region 410 between opposed parts of the body portion 380. Alternatively, according to certain other embodiments of the present invention the weld itself could be formed in the trough region and may secure the opposed sides in the body portion 380 together leaving a small recessed area aligned with the winged portions. The weld in such an instance may not be in the plane P-P of the majority of the wing portions.

The wing tips 365, 375 may be slightly downturned with respect to the plane P-P and a remaining portion of the wings 360, 370. For example, the wing tip 365 can have a downturned portion which is downturned with respect to a substantially flat linearly extending portion 425. Likewise, the wing tip 375 can include a downwardly turned portion which extends into a substantially flat linearly extending portion 435. These downturned regions proximate to the wing tips are an optional feature. Alternatively as shown in FIG. 4 the whole wing portions from the central body region to the tips may be flat. As the flat portions 425, 435 of each wing shown in FIG. 4 extends towards the body portion the cross-section illustrates the weld 400 which is provided by partially consumed insert tape material together with consumable electrode wire material which is constantly consumed during a welding process (see later). The upper surface (shown in FIG. 4) of the cross-section of the insert 350 is thus substantially flat and smooth. The weld 400 illustrated in FIG. 4 includes a shallow convex bump 450 which is a manifestation of the welding process. This may optionally be smoothed subsequent to the securing station/welder and the point of winding the insert tape over an underlying layer. As illustrated in FIG. 4 the trough or open region 410 between opposed sides 460, 470 of the body can remain open as shown in FIG. 4. Aptly according to certain other embodiments of the present invention the sides 460, 470 in the body portion can be urged much closer together prior to securing together leaving a less open area 410 in the cross-section. The sides 460, 470 of the body portion 380 are joined in a generally U-shaped folded end region 480. Aptly the overall cross-section of the insert tape is generally T-shaped.

Figure 5:
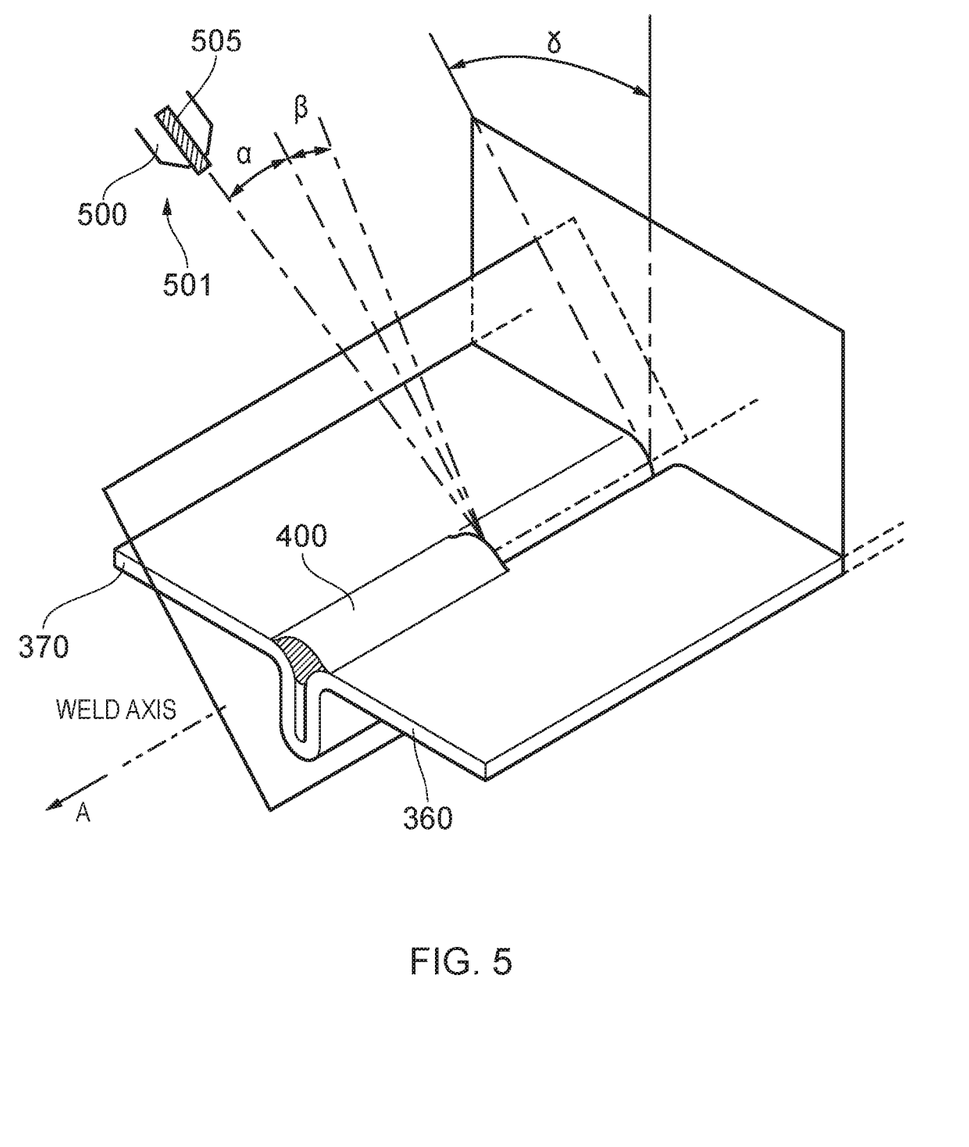
FIG. 5 illustrates a way in which wing portions in a cross-section of an elongate tape can be laterally immobilised.

FIG. 5 helps illustrate how the welding joint 400 illustrated in FIG. 4 can be formed using a welding tool 500 and consumable electrode filler wire 505 (or optional separate filler wire). As illustrated in FIG. 5 the opposed wings 360, 370 in the cross-section of the insert tape effectively provide a respective work piece for the welding process. Because the work pieces are effectively curved where the weld is provided the welding process makes a flanged joint. The sides of the body portion 380 may optionally be urged together to form a closed butt joint but in the embodiment illustrated in FIGS. 4 and 5 the weld is an open butt joint. The two work pieces (formed by portions of the spaced apart wings and sides in the central body region) have a small gap between them during the welding process. It will be appreciated that the edge of each joint may optionally be prepared prior to welding by cutting and/or machining and/or chipping and/or grinding and/or cutting or gouging.

The welding process illustrated in FIG. 5 according to certain embodiments of the present invention is a MIG-type weld. Aptly a Fronius TransPuls Synergic 5000 CMT machine with 316 Lsi 1.0 mm diameter consumable electrode wire can be utilised together with a 98% argon and 2% carbon dioxide shielding gas. It will be appreciated that a metal inert gas (MIG) welding technique is a subset of a gas metal arc welding (GMAW) welding technique suitable for use. During the welding process an electric arc forms between a consumable wire electrode and the work pieces. This heats the work piece material causing opposed work pieces to melt and join. A shielding gas shields the process from contaminants in the air. This is a cold metal transfer (CMT) process. Wire movement of the consumable electrode is incorporated into a control process whereby heat is inserted only briefly. Whilst reference is made to a cold metal transfer process it will be appreciated that this reference to temperature is relative to other welding techniques which generate far greater heating profiles. Use of a cold metal transfer welding process can help reduce deformation of the cross-section of the tape making it suitable for subsequent winding. Likewise the process can be highly automated.

According to certain embodiments of the present invention the angle $\gamma$ is aptly 0 degrees. Aptly as an alternative $\gamma$ equals 0 to 15 degrees. The welding head 501 is set at a laid back angle $\alpha$ which is approximately 10 to 40 degrees. Aptly $\alpha$ is 15 to 30 degrees. Aptly $\alpha$ is 20 to 25 degrees.

It will be appreciated that certain other techniques can be utilised for securing and thereby laterally immobilising portions of the wing portions of the insert tape together. For example cold welding or contact welding or fusion welding or solid state welding may be utilised. Other options to secure adjacent regions together could be used such as bonding the regions together. This may be achieved by creating a continuous or repeated series of bonds via adhesive or mechanical bond. Aptly a brazing process or soldering process or thermal spraying process or the like can be used.

By laterally immobilising wing portions in the cross-section of the insert tape, which can be done by securing adjacent regions of the wing portions and/or by securing opposed regions of the sides of the body portion of the cross-section together, the loading mechanism across the profile of the insert tape is modified relative to inserts without such a securing mechanism. This helps with fatigue mitigation on the base of the strip at the distal end of the body region or at other locations in the cross-section which would otherwise be cause to bend during use as the flexible pipe incorporating the insert and adjacent carcass windings is flexed in use. By securing adjacent regions in the cross-section of the profile together to thereby laterally immobilise wing portions the wings effectively move as one piece. In this way bending forces at any position in the cross-section are avoided wholly or at least partially. The wings effectively act like a plate in tension, rather than one or more hinged bends, by including a securing mechanism which bridges the central fold in the cross-section over the centre of the body. Because the wing portions are laterally immobilised and move laterally as one when carcass windings move relative to another, as a flexible pipe flexes, the wings with their tips which rest on the carcass windings do not become pulled apart or pushed together by friction forces. Rather the wing tips slip against an opposed surface as one carcass winding moves relative to another rather than a space between wing portions being constantly opened and closed.

Referring again to FIG. 5 it will be appreciated that the weld tool 500 (and any optional filler wire (505 fed through the weld tool or introduced separately)) can be angled with respect to the weld axis W as the adjacent wing portions in the insert tape are welded together. FIG. 5 illustrates how a push angle $\alpha$ can be utilised for forehand welding and travel angle or alternatively how a drag angle $\beta$ can be utilised for backhand welding and travel angle. FIG. 5 also illustrates how a work angle $\gamma$ can be aligned so as to achieve a desired weld profile in the cross-section. It will be appreciated by those skilled in the art that a push angle or drag angle and a work angle can be selected in accordance with conventional techniques to achieve a weld having a desired profile according to a speed of the oncoming folded strip in a direction A, the materials used and other weld parameters.

Using the Fronius TransPuls Synergic 5000 CMT machine with 316 Lsi electrode wire and shielding gas as previously described, a 2 metres/min manufacturing speed is achievable with other welding parameters set at a wire feed of 7.5 metres/min, a current supply of 132 amps and voltage of 10.9 volts. It will be appreciated that such parameters are variable according to use.

Figure 6:
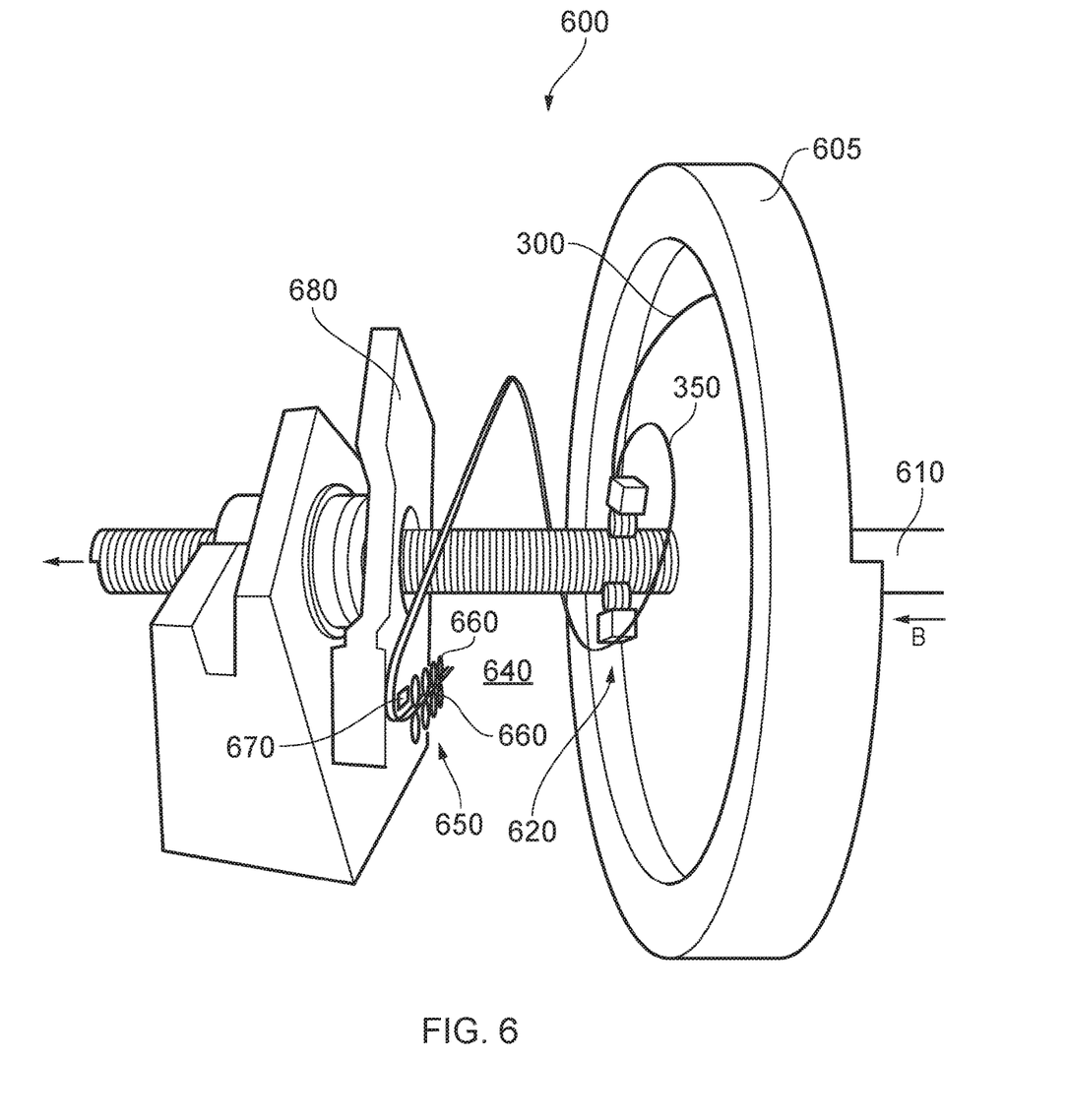
FIG. 6 illustrates a winding station for providing a carcass layer.
Figure 7:
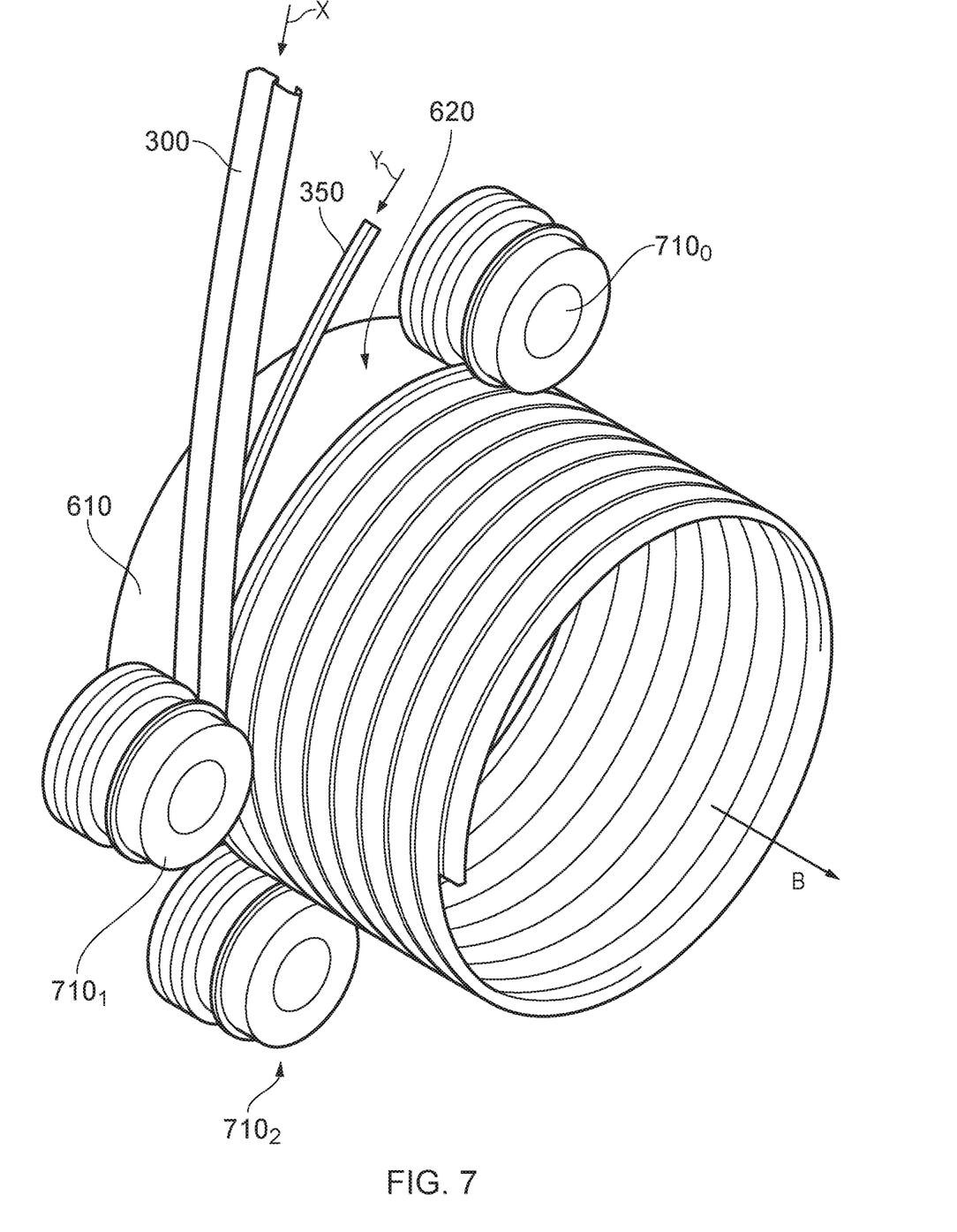
FIG. 7 illustrates a region of the winding station where the self-interlocking windings and insertable tape are wound over an underlying layer.

FIG. 6 helps illustrate a winding station where a carcass layer for a flexible pipe can be manufactured. The carcass station 600 includes a winding machine housing 605 which is fed pre-formed carcass tape having a desired cross-section as shown in FIG. 3 so as to achieve self-interlocking of adjacent carcass windings as they are wound on an underlying substantially cylindrical outer surface of a mandrel 610. In FIG. 6 the mandrel 610 is illustrated being constantly fed in the direction B, from right to left in FIG. 6, and this mandrel passes through the centre of the winding machine. The carcass tape 300 is provided from a source (not shown) and is delivered to a winding point 620. This winding point is illustrated more clearly in FIG. 7 and is associated closely with the touchdown point of the tapes on an underlying surface. As shown in FIG. 7 the carcass winding which has a pre-formed self-interlocking profile is delivered along a carcass delivery axis X. Alternatively the insert tape 350 is delivered along a respective insert delivery axis Y. Support rollers $710_{0-2}$ are located to help urge an incoming carcass winding into an interlocking relationship with a preceding winding and to keep the interlocked windings together. Likewise these rollers 710 help assist in locating an incoming winding of the insert tape between two adjacent carcass tape windings. As a result a carcass layer 120 is provided which includes self-interlocked carcass tape windings with insert windings covering the radially inner gaps of those carcass windings.

Turning again to FIG. 6 the manner in which the folded strip insert tape 350 is provided and the pathway it follows is shown. At an upstream end 640 of the insert forming station 650 flat strip is provided from an insert strip source (not shown). The flat strip follows a predetermined pathway between opposed rollers. Four pairs of opposed rollers 660 are illustrated in FIG. 6. As the strip is passed between the rollers a predetermined shape is progressively formed in the tape by consecutively making fold lines and other such deformations in the cross-sectional profile. By the time the tape has passed through all of the plurality of spaced apart pairs of rollers the tape has a cross-section which has a uniform cross-section and which is generally T-shaped as previously described. A final roller pair may include wire brushes to help remove any optional lubricant from the profiled strip. Aptly the lubricant used may be a powdered wax. Aptly the lubricant may be a fluid comprising oil or grease. Other techniques for removing any lubricant and otherwise cleaning/preparing the profiled strip could of course be utilised prior to securing regions together by welding or bonding. A welding station 670 includes the welding tool 500 and consumable electrode. It will be appreciated that if other welding techniques or indeed other securing techniques are utilised to laterally immobilise wing portions in the cross-section of the insert tape then the securing station 670 will include the needed parts to carry out that securing process. The insert tape is constantly provided by the strip source and passes through the forming rollers and securing station 670 and is delivered from the securing station 670 into a generally helical backwards facing pathway until the tape 350 is delivered to the winding point 620. This occurs in real time substantially contemporaneously with delivery and interlocking of the primary carcass tape windings.

Optionally as the strip which is formed into a generally T-shaped cross-section comes off the final roller it has a pathway that directs the profiled wire into a T-shaped (or other shape to accommodate the profiled wire) recess in a copper block. A further copper block is located over the recess. The two metal blocks could optionally be integrally formed. The copper block with a T-shaped groove can be used to help locate and restrict movement of the T-profile proximate to the welding point. Additionally the copper block can help act as a heat sink to help avoid undue deformation in the cross-sectional profile of the folded strip. Aptly the block can be cooled using compressed air or water.

The opposed roller pairs and securing station, including welder and locating heat sink block, rotate on a rotating insert winder 680. Rotational speed of this winder is coordinated with the winding speed of other parts of the process.

Whilst certain embodiments of the present invention have been described for utilising a welding station to act as a securing station to laterally immobilise wings in a profile of a folded strip, it will likewise be appreciated that the welder provides a heat source. Whilst other securing techniques are possible, provision of a heat source of some description, such as the welder or alternatively an induction heater or infra-red heater, can be utilised to help relieve residual stress in the body of the folded strip caused by the folding process. Laterally immobilising wing portions of the folded strip using a welding process that generates heat has an advantage of simultaneously laterally immobilising regions in the cross-sectional profile as well as releasing or eliminating residual stress in regions by heat generated in the welding process. Aptly the welding process can simultaneously heat the distal end of the body portion in the profile of the folded strip where residual stress build up can otherwise be stored. Such residual stress might otherwise cause failure of a flexible pipe over its lifetime in use. Likewise heating using welding can release residual stress completely or at least partially in other folded regions. Certain embodiments of the present invention do not laterally secure regions in the cross-section together but instead focus solely upon the elimination or partial relief of residual stress.

Figure 8:
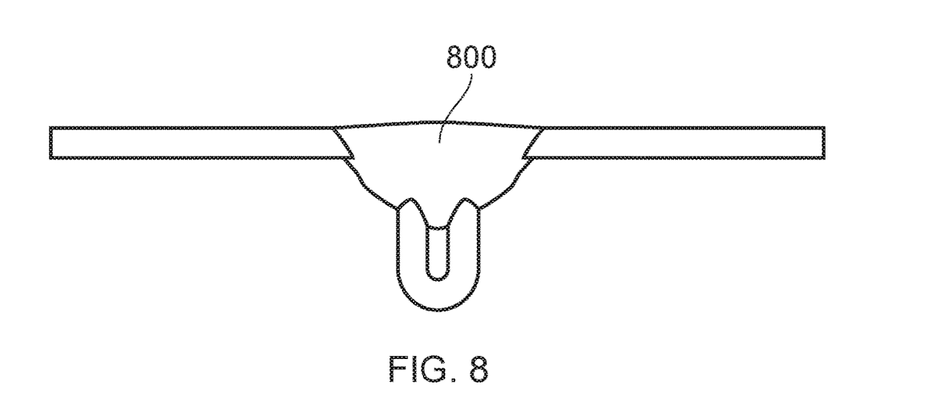
FIG. 8 illustrates an alternative cross-section of a welded elongate tape.

FIG. 8 helps illustrate an alternative cross-section to the previously described windable insert in which a weld 800 has been formed. The weld 800 breaks through the inner surface of the tape and extends further into the trough. Nevertheless the weld laterally immobilises the wings, can be formed originally from a flat strip with a step of securing, and includes a body region which can be located between carcass windings to help locate the insert in use and prevent its dislocation from correct positioning in the carcass layer.

Figure 9:
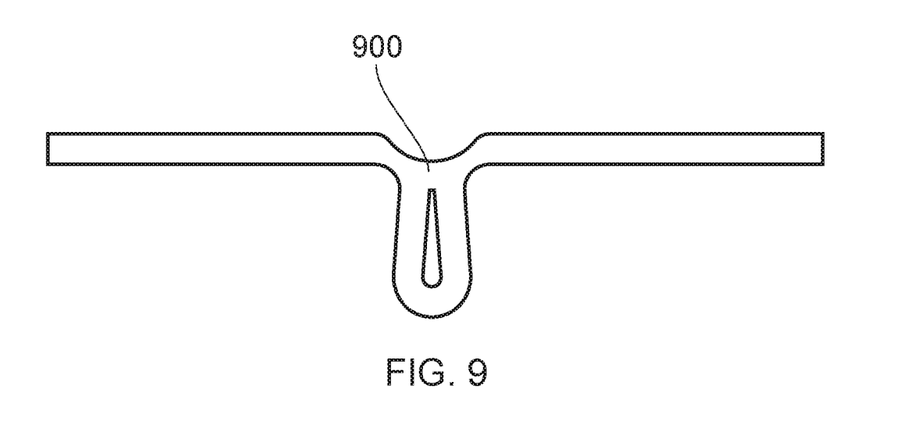
FIG. 9 illustrates an Autogenous Laser weld.

FIG. 9 helps illustrate an alternative welding process and an alternative cross-section generated by such an alternative welding process which can be utilised to help immobilise regions of the wings and/or body portion of a folded strip which can then be utilised to help form a carcass layer. In more detail FIG. 9 helps illustrate an autogenous laser weld 900. This is a weld joint developed by melting the opposed surfaces and subsequent solidification only (without filler). That is to say rather than the previously described welding technique which utilises a consumable wire as an electrode no filler wire or consumable electrode need be required according to certain embodiments of the present invention. Whilst the weld profile includes a slight central dip the overall effect of winding such a tape between carcass windings is to smooth the gaps within carcass windings that would otherwise exist if such a profiled insert winding were not located between adjacent self-interlocking carcass windings. As such the folded strip with laser weld can help reduce FLIP relative to conventional carcass layers.

Figure 10:
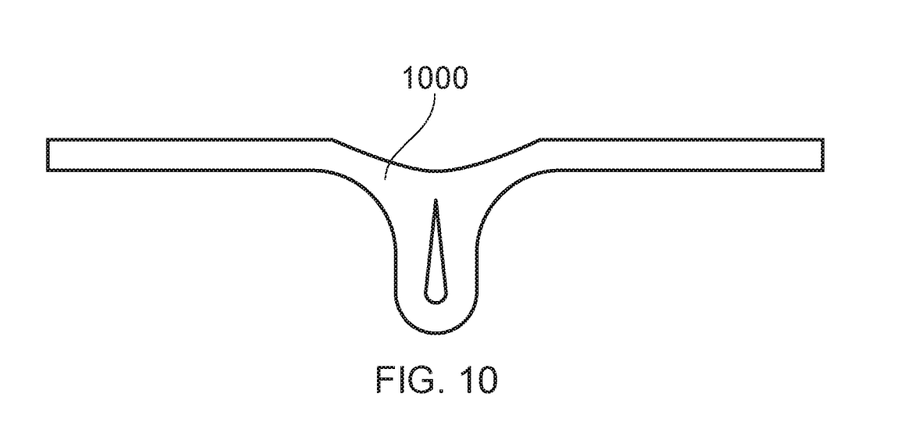
FIG. 10 illustrates an Autogenous TIG weld.

FIG. 10 helps illustrate an alternative welding process and an alternative cross-section generated by such an alternative welding process which can be utilised to help immobilise regions of the wings and/or body portion of a folded strip which can then be utilised to help form a carcass layer. In more detail FIG. 10 helps illustrate an autogenous TIG weld 1000. This is a weld joint developed by melting the opposed surfaces and subsequent solidification only (without filler). That is to say rather than the first described welding technique which utilises a consumable wire as an electrode, no filler wire or consumable electrode need be required according to certain embodiments of the present invention. Whilst the weld profile provided includes a slight central dip, the overall effect of winding such a tape between carcass windings is to smooth the gaps between carcass windings that would otherwise exist if such a profiled insert winding were not located between adjacent self-interlocking carcass windings. As such the folded strip with laser weld can help reduce FLIP relative to conventional carcass layers.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing an elongate tape element for bridging a gap between windings of a flexible pipe body layer, comprising the steps of:
   providing an elongate sheet having a uniform thickness and a first and further spaced apart long edge, to a first pair of a plurality of spaced apart pairs of opposed forming roller elements;
   via the pairs of roller elements, progressively forming a cross-sectional profile in the sheet that comprises a body portion comprising a folded central region of the sheet and a first and further wing portion that each extend away from the body portion and terminate at a respective long edge of the sheet; and
   securing adjacent regions of the wing portions and/or opposed regions of the body portion together thereby providing a windable elongate tape element having laterally immobilised wing portions.

2. The method as claimed in claim 1, further comprising:
   securing regions together by welding the regions together via a fusion welding or solid state welding process.

3. The method as claimed in claim 2, further comprising:
   welding the regions together continuously along a whole length of the tape element thereby providing a continuous weld along the tape element.

4. The method as claimed in claim 3, further comprising:
   providing a substantially smooth abutment surface to the elongate tape element, said abutment surface comprising an outer surface portion of the weld and a respective outer surface portion of each of the first and further wing portions.

5. The method as claimed in claim 2, further comprising:
   welding regions together repeatedly as a row of spaced apart spot welds along a length of the tape element.

6. The method as claimed in claim 2, further comprising:
   welding the regions together in a single pass as the folded sheet having the formed cross-sectional profile with the folded central region passes proximate to at least one welding station.

7. The method as claimed in claim 2, further comprising:
   securing adjacent regions together subsequent to the step of progressively forming the cross-sectional profile via the pairs of roller elements.

8. The method as claimed in claim 2, further comprising:
   welding regions together via a single sided process.

9. The method as claimed in claim 2, further comprising:
   welding regions together in an open or closed butt joint.

10. The method as claimed in claim 2, further comprising:
    welding regions together in an open or closed flanged joint.

11. The method as claimed in claim 2, further comprising:
    welding regions together to provide a single-flare V-groove weld.

12. The method as claimed in claim 2, further comprising simultaneously relieving residual stress in the sheet having the formed cross-sectional profile with the folded central region via heat generated during the welding process.

13. The method as claimed in claim 1, further comprising:
    securing regions together by bonding the regions together via an adhesive or mechanical bond, or via a process selected from the group consisting of an adhesive bonding process, a brazing process, a soldering process, or a thermal spraying process.

14. A method of manufacturing flexible pipe body, comprising the steps of:
    helically winding at least one armouring tape over an underlying layer; and
    helically winding an elongate tape element manufactured per the method as claimed in claim 1 over the underlying layer whereby at least a region of the body portion of the elongate tape element is located between adjacent windings of the armouring tape.

15. The method as claimed in claim 14, further comprising:
    securing regions together by welding the regions together via a fusion welding or solid state welding process; and further comprising welding the regions together continuously along a whole length of the tape element thereby providing a continuous weld along the tape element.

16. The method as claimed in claim 15, further comprising simultaneously relieving residual stress in at least one region of the sheet having the formed cross-sectional profile with the folded central region as the sheet is welded.

17. An elongate tape element for bridging a gap between windings of a flexible pipe body layer, manufactured per the method as claimed in claim 1.

18. Flexible pipe body comprising a layer including a winding of the elongate tape element as claimed in claim 17; wherein, said layer comprises a carcass layer that further includes a winding of a self-interlocking armouring tape.

19. The method as claimed in claim 1, further comprising heating the folded central region or at least one other region of the cross-sectional profile of the sheet to thereby relieve residual stress in the folded sheet material.

* * * * *

UNITED STATES PATENT AND TRADEMARK OFFICE
CERTIFICATE OF CORRECTION

PATENT NO. : 11,085,561 B2
APPLICATION NO. : 16/347661
DATED : August 10, 2021
INVENTOR(S) : Shippen et al.

Page 1 of 1

It is certified that error appears in the above-identified patent and that said Letters Patent is hereby corrected as shown below:

In the Specification

In Column 6, Line 24, delete "cuding" and insert --including- --.

In the Claims

In Column 15, Claim 6, Line 45, after "pass as the" delete "folded".

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*